United States Patent [19]

Jeong

[11] Patent Number: 5,583,657
[45] Date of Patent: Dec. 10, 1996

[54] METHOD AND APPARATUS FOR SCANNING IMAGE DATA

[75] Inventor: Je-Chang Jeong, Seoul, Rep. of Korea

[73] Assignee: Samsung Electronics Co., Ltd., Kyongki-Do, Rep. of Korea

[21] Appl. No.: 11,546

[22] Filed: Feb. 1, 1993

[51] Int. Cl.$^6$ .............................. H04N 1/415; H04N 7/12
[52] U.S. Cl. ..................... 358/432; 358/426; 358/433; 348/408; 348/420
[58] Field of Search .................... 358/432, 426, 358/474, 433, 261.2; 375/122; 348/384, 398, 420, 406, 408; 250/563, 227.26, 227.29; H04N 1/415

[56] References Cited

U.S. PATENT DOCUMENTS

| | | | |
|---|---|---|---|
| 3,478,163 | 11/1969 | Chatelon | 358/433 |
| 3,636,250 | 1/1972 | Haeff | 178/6.5 |
| 3,659,950 | 5/1972 | Troll et al. | 356/199 |
| 3,993,976 | 11/1976 | Ginsburg | 340/146.3 |
| 4,394,774 | 7/1983 | Widergren et al. | 382/56 |
| 4,432,019 | 2/1984 | Maier | 358/433 |
| 4,774,574 | 9/1988 | Daly et al. | 348/406 |
| 4,831,659 | 5/1989 | Miyaoka et al. | 358/433 |
| 5,162,923 | 11/1992 | Yoshida et al. | 358/433 |
| 5,170,264 | 12/1992 | Saito et al. | 358/433 |
| 5,189,526 | 2/1993 | Sasson | 358/426 |
| 5,257,107 | 10/1993 | Hwang et al. | 358/310 |
| 5,289,548 | 2/1994 | Wilson et al. | 358/433 |
| 5,299,239 | 5/1994 | Iwahashi et al. | 358/433 |

*Primary Examiner*—Kim Yen Vu
*Assistant Examiner*—Madeleine Anh-vinh Nguyen
*Attorney, Agent, or Firm*—Sughrue, Mion, Zinn, Macpeak & Seas

[57] ABSTRACT

The present invention relates to a method of and an apparatus for scanning an N×N image signal in a particular direction depending upon an energy distribution of the two-dimensional data. The invention involves scanning image signal transform coefficients of an N×N block using a slope determined on the basis of the energy distribution pattern, the blocks being defined by transforming an input image signal of a time domain to signals of a frequency domain, compressing and transferring the scanned transform coefficients, restoring the compressed transform coefficient data and rearranging the restored coefficient data into original image data of N×N blocks by scanning them in conformance with the energy distribution pattern.

9 Claims, 7 Drawing Sheets

FIG. 1

| | | | N=8 | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

| | | | N=8 | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

| | | | N=8 | | | | |
|---|---|---|---|---|---|---|---|
| 1 | 2 | 3 | 4 | 6 | 8 | 10 | 13 |
| 5 | 7 | 9 | 11 | 14 | 16 | 18 | 21 |
| 12 | 15 | 17 | 19 | 22 | 24 | 26 | 29 |
| 20 | 23 | 25 | 27 | 30 | 32 | 34 | 37 |
| 28 | 31 | 33 | 35 | 38 | 40 | 42 | 45 |
| 36 | 39 | 41 | 43 | 46 | 48 | 50 | 53 |
| 44 | 47 | 49 | 51 | 54 | 56 | 58 | 60 |
| 52 | 55 | 57 | 59 | 61 | 62 | 63 | 64 |

|   |    |    |    |    |    |    |    |
|---|----|----|----|----|----|----|----|
| 1 | 5  | 12 | 20 | 28 | 36 | 44 | 52 |
| 2 | 7  | 16 | 23 | 31 | 39 | 47 | 55 |
| 3 | 9  | 17 | 25 | 33 | 41 | 49 | 57 |
| 4 | 11 | 19 | 27 | 35 | 43 | 51 | 59 |
| 6 | 14 | 22 | 30 | 38 | 46 | 54 | 61 |
| 8 | 16 | 24 | 32 | 40 | 48 | 56 | 62 |
| 10| 18 | 26 | 34 | 42 | 50 | 58 | 63 |
| 13| 21 | 29 | 37 | 45 | 53 | 60 | 64 |

N=8 (width), N=8 (height)

FIG. 6D

|   |    |    |    |    |    |    |    |
|---|----|----|----|----|----|----|----|
| 1 | 9  | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| 8 | 16 | 24 | 32 | 40 | 48 | 56 | 64 |

N=8 (width), N=8 (height)

METHOD AND APPARATUS FOR SCANNING IMAGE DATA

FIELD OF THE INVENTION

The present invention relates to a coding and decoding device for a digital image signal processing system, and more particularly to a method and apparatus for scanning image data in various ways depending upon an energy distribution of two-dimensional data, which can effectively compress image data.

BACKGROUND OF THE INVENTION

Typically, in such a digital image processing system, a compression of the digital image signal band is performed in order to improve an image signal transferring efficiency. Such a compression of the digital image signal is substantially executed in such a way that an image signal input in the time domain is transformed into the frequency domain. As a result, most of the image energies are condensed into some of the transform coefficients of each N×N block (where N is a positive integer). The transform coefficients of relatively low energy are converted to zero ("0") by comparing the coefficients with a predetermined threshold value so as to extend the number of "0" valued coefficients as much as possible. The coefficients are then converted into a serial data stream by way of a fixed scanning method such as a zigzag scanning method, in which a constant scanning slope of "1" is used. That is, the number of zero-valued transform coefficients (i.e., runlength) is counted to transfer a column (runlength, amplitude) of the image data. An end of block (EOB) bit follows the last non-zero valued transform coefficient in the block. The zero-valued coefficients following the last non-zero valued transform coefficient are not considered as practical data and only the number of zero-valued coefficients is transferred to establish the desired data compression. The data is compressed from its original form because only the coefficients having a non-zero value are transferred. The scanning of the image data to form the data stream is effected by using a fixed slope zigzag scanning method as previously described. FIG. 1 illustrates an example of the zigzag scanning method, in which N is set to eight transform coefficients and numerals in the block denote the scanning order.

In FIG. 1, the transform coefficients are partially distributed in a horizontal, vertical or diagonal direction in accordance with the input image pattern. For this reason, when the image data is scanned by the fixed-slope zigzag scanning method, the EOB bit located after the last non-zero valued coefficient is not produced as quickly as possible. Specifically, the fixed slope zigzag scanning method will produce the EOB bit as quickly as possible only for one particular energy distribution of transform coefficients, the distribution in which the non-zero valued coefficients are located in the shaded area of FIG. 4C and the zero-valued coefficients are located in the non-shaded area. This is because this particular input distribution corresponds exactly with the zigzag scanning method. For other types of input patterns, (e.g. FIGS. 4A, 4B, 4D and 4E), however, the conventional zigzag scanning method which always uses a slope of "1" will not correspond exactly with the input patterns. This causes a problem in that the data compressing efficiency for these other input patterns is likely to be limited-because the number of zero valued coefficients which follows the EOB bit is also transferred to compress the image data. The transferring efficiency is maximum when only the non-zero valued coefficients are transferred.

SUMMARY OF THE INVENTION

Accordingly, an object of the present invention is to provide an image processing technique which can properly select the scanning direction to produce the EOB (end of block) bit as quickly as possible, during formation of the digital data stream, thus improving the band compressing efficiency.

Specifically, it is an object of the invention to not be confined to always using the zigzag scanning (slope of "1") technique but to instead vary the slope of the scanning depending on the input data pattern. Thus, an optimum transferring efficiency can always be obtained.

To achieve the above object, according to an aspect of the present invention, there is provided a method of scanning image data which makes use of a distribution in energy of the two-dimensional data, comprising the steps of: scanning image signal transform coefficients of N×N blocks on the basis of the energy distribution pattern, the blocks being defined by transforming the input image signal in the time domain to signals of the frequency domain, compressing and transferring the scanned transform coefficients; and, restoring the compressed transform coefficient data and rearranging the restored coefficient data into original image data of N×N blocks by scanning them in conformance with the energy distribution pattern.

According to another aspect of the present invention, there is provided an apparatus for scanning image data using a distribution of energy of the two-dimensional data, comprising: an encoder for transforming input image signals of the time domain into signals of the frequency domain, scanning the transform coefficients of each N×N block in accordance with the energy distribution pattern, and compressing and transferring the scanned transform coefficients; and, a decoder for restoring the compressed data transferred from the encoder and rearranging the transform coefficients into original image data of N×N blocks in conformance with the scanning order based on the energy distribution pattern.

The above and other objects, features and advantages of the invention will be apparent from the following description taken with reference to the accompanying drawings.

BRIEF DESCRIPTION OF THE DRAWINGS

FIG. 1 is a view showing an example of a conventional scanning method;

DETAILED DESCRIPTION OF THE INVENTION

Now, a preferred embodiment of the present invention will be described in detail.

Figure 2:
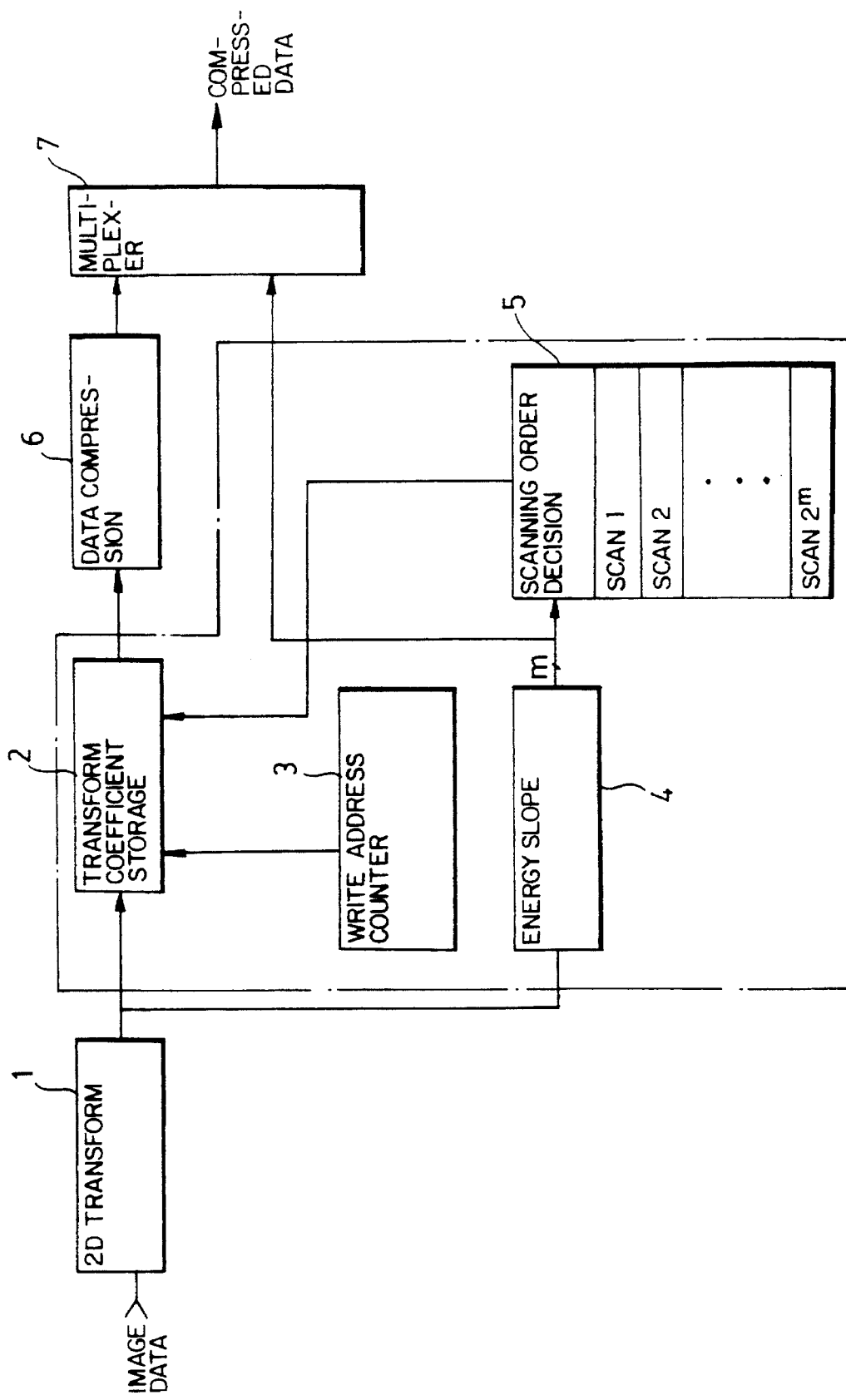
FIG. 2 is a block diagram of an exemplary construction of an encoding unit employed with a scanning device according to the present invention.

Referring to FIG. 2, an example of an encoder employed with a scanning device according to the present invention is shown. In the drawing, a two-dimension (2D) transform portion 1 transforms a digital input image signal into transform coefficients of an N×N block in the frequency domain, where N is a positive integer representing a certain number of transform coefficients. The image input signal is considered as an error component estimated through a differential pulse code modulation (DPCM) loop. A transform coefficient storage portion 2 stores the transform coefficients output of the 2D transform portion 1 in accordance with an output signal of a write address counter 3. The transform coefficient storage portion 2 may be preferably embodied by a video RAM. An energy slope classification portion 4 identifies the energy distribution pattern of the N×N block of transform coefficients supplied from the 2D transform portion 1 and outputs m-bit slope data corresponding to the slope of each of the N×N block patterns. A scan order decision portion 5 stores $2^m$ scan orders corresponding to the slope data and selectively outputs the scan order corresponding to the m-bit slope data supplied from the energy slope classification portion 4 to the transform coefficient storage portion 2. More specifically, the scan order decision portion 5 has addresses for the different $2^m$ scan orders and outputs any one address corresponding to the m-bit slope data outputted from the energy slope classification portion 4 so as to sequentially read out the transform coefficients stored in the transform coefficient storage portion 2 in accordance with the scan order read out from the scan order decision portion 5. Preferably, the scan order decision portion 5 is formed from a read only memory (ROM).

A data compression portion 6 quantizes the transform coefficients sequentially outputted in accordance with the address supplied from the scan order decision portion 5 and compresses the quantized transform coefficient data by using a variable length coding technique. The data compression portion 6 has a buffer built therein and chooses a quantization step size in accordance with the fullness state of the buffer.

A multiplexer 7 selectively outputs the compressed data supplied from the data compression portion 6 and the slope data from the energy slope classification portion 4.

Figure 3:
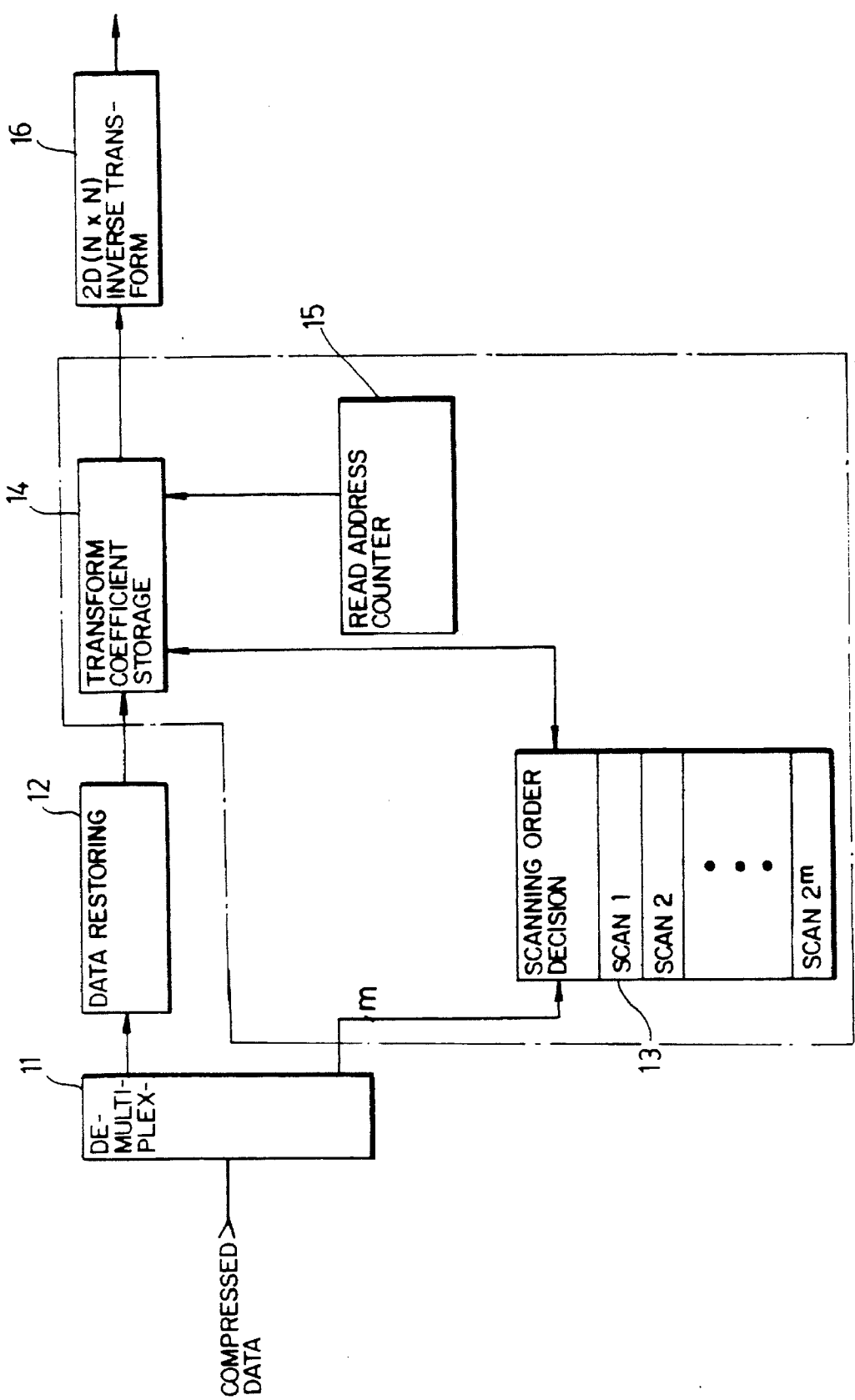
FIG. 3 is a block diagram of an exemplary construction of a decoding unit employed with a scanning device according to the present invention.

FIG. 3 shows a block diagram of an exemplary decoding unit or decoder employed with a scanning device according to the present invention. In the drawing, a demultiplexer 11 classifies the compressed data and the slope data from the output data of the multiplexer 7 shown in FIG. 2, and a data restoring portion 12 restores the data compressed by the data compression portion 6 (FIG. 2) into an original transform coefficient data. A scan order decision portion 13 has $2^m$ scan order data stored therein and selectively outputs the scan order corresponding to the m-bit slope data classified by the demultiplexer 11 to a transform coefficient storage portion 14. More specifically, the scan order decision portion 13 has addresses for the different $2^m$ scan order data and selectively outputs any one address corresponding to the m-bit slope data outputted from the demultiplexer 11 to the transform coefficient storage portion 14. The scan order decision portion 13 is preferably formed of a ROM. The transform coefficient storage portion 14 rearranges the transform coefficients outputted from the data restoring portion 12 in accordance with the address of the scan order decision portion 13 into the transform coefficients of an N×N block and stores the rearranged transform coefficients. The transform coefficient storage portion 14 sequentially outputs the rearranged transform coefficients in accordance with the address supplied from a read address counter 15. The inverse transform coefficient storage portion 14 is preferably formed of a video RAM.

A two-dimensional inverse transform portion 16 converts the transform coefficients outputted from the transform coefficient storage portion 14 into an original time domain image signal (i.e., digital input image or error component estimated through a DPCM loop).

Now, the method of and apparatus for scanning image data using a two-dimensional data energy distribution will be described in detail.

In FIG. 2, the digital input image or image input signal considered as the estimated error component passed through a DPCM loop is converted to the transform coefficients of an N×N (for example, N in this example is set to eight) block of the frequency domain by the 2D transform portion 1. The transform coefficients output from the 2D transform portion 1 are stored into the transform coefficient storage portion 2 in accordance with the address signal supplied from the write address counter 3.

Further, the transform coefficients supplied from the 2D transform portion 1 are input to the energy slope classification portion 4 which identifies the transform coefficient energy distribution pattern of the block of N×N coefficients and outputs m-bit slope data according to the energy distribution data of the block of N×N coefficients thus identified.

FIGS. 4A through 4E are views showing various examples of image energy distribution patterns for arbitrary transform coefficient arrays (N×N) in which oblique line portions denote energy distribution patterns. More specifically, in FIG. 4A the transform coefficient energy is horizontally distributed at an upper area of the block.

Figure 4A:
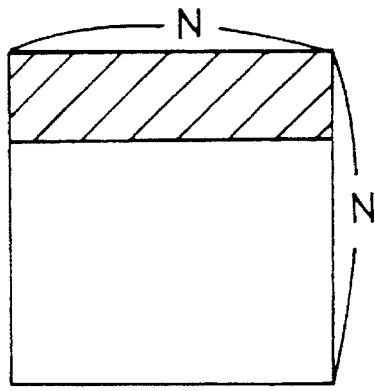
FIGS. 4A through 4E are views showing exemplary image energy distribution patterns of arbitrary transform coefficients.
Figure 4B:
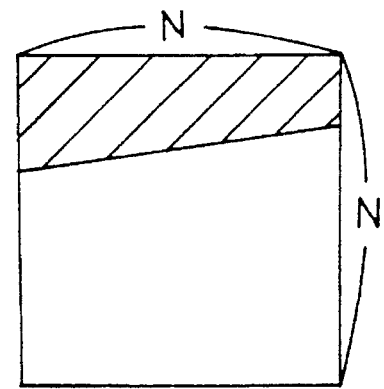
Figure 4C:
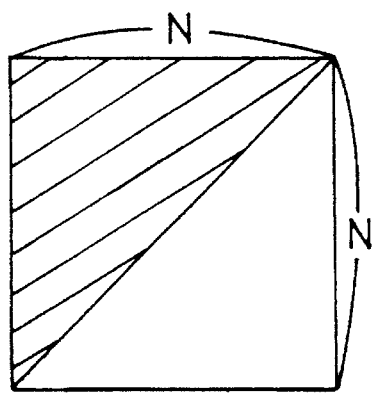
Figure 4D:
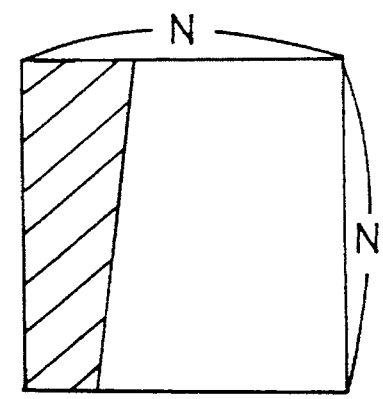
Figure 4E:
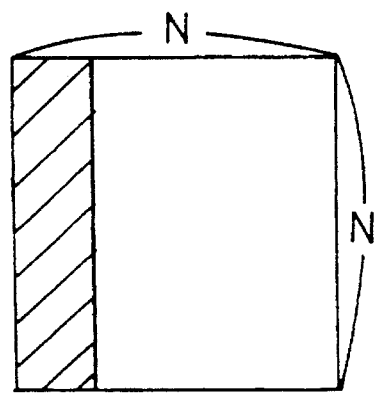

FIG. 4B shows a case in which the transform coefficient energy pattern outputted from the 2D transform portion 1 is generally horizontally distributed but slightly inclined to the left of the block. FIG. 4C illustrates an example of the transform coefficient energy distributed in a diagonal direction of the block. Also, FIG. 4D shows a case in which the transform coefficient energy is generally vertically distributed but slanted to the upper side of the block. FIG. 4E denotes an example of the transform coefficient energy vertically distributed at the left side of the block.

More specifically, the energy slope classification portion 4 classifies the energy distribution pattern of the transform coefficients outputted from the 2D transform portion 1 into one of $2^m$ slopes and outputs the classified energy distribution pattern as m-bit slope data. In this case, as the number of bits making up the slope information is increased, the compression efficiency can be improved. But, the slope information must be transferred to a decoder so as to be employed in decoding the encoded data. Therefore, it is undesirable to increase the number of bits of slope data without limitation. Preferably, the slope data is set to three or four bits.

Figure 5:
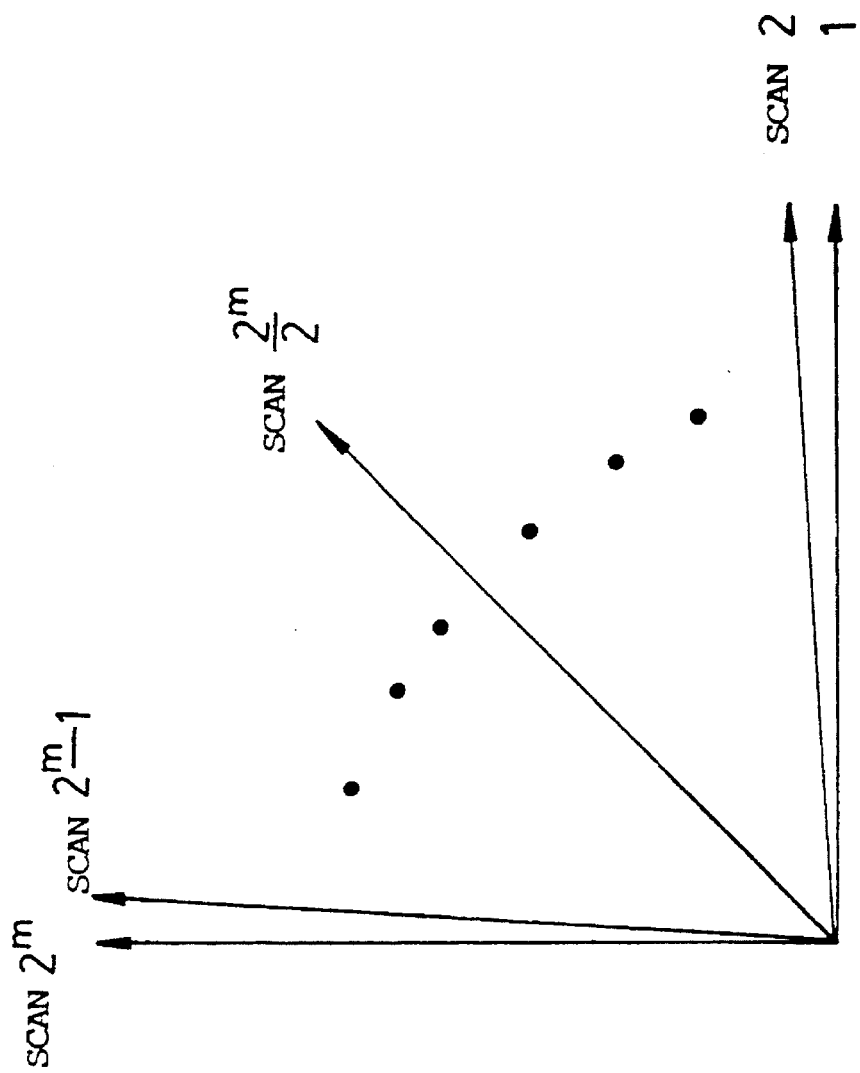
FIG. 5 is a view illustrating slopes in a scanning direction of image energy distribution; and, FIGS. 6A through 6D are views illustrating scanning orders according to the present invention.

FIG. 5 shows the various slopes in scanning direction. If the transform coefficient energy distribution pattern as shown in FIG. 4A is outputted from the 2D transform portion 1, then the slope data SCAN 1 in FIG. 5 is produced by the energy slope classification portion 4. If the energy distribution pattern shown in FIG. 4B is obtained from the 2D transform portion 1, then the slope data SCAN 2 as shown in FIG. 5 is obtained.

Similarly, when the energy of the transform coefficients outputted from the 2D transform portion 1 is distributed in a pattern shown in FIG. 4C, the energy slope classification portion 4 outputs a slope data SCAN $2^m/2$ in FIG. 5. This is the same slope that the conventional device uses for every input energy distribution, the slope of "1" or 45°.

Alternatively, when the energy pattern is obtained as shown in FIG. 4E, the slope data SCAN $2^m$ is produced by the energy slope classification portion 4.

The scanning order storage portion 5, in which the $2^m$ sets of scanning order data are previously stored, selects one scanning order according to the m-bit slope data supplied from the energy slope classification portion 4 and outputs an address corresponding to the selected scanning order. The address signal thus produced serves as a read address for the transform coefficient storage portion 2. Accordingly, the transform coefficients stored in the transform coefficient storage portion 2 are sequentially outputted in accordance with the address signal (i.e., read address) supplied from the scanning order storage portion 5. That is, if the energy distribution of the transform coefficient outputted from the 2D transform portion 1 is in a pattern shown in FIG. 4A, then the energy slope classification portion 4 outputs the m-bit slope information SCAN 1 and the scanning order decision portion 5 produces an address according to the m-bit SCAN 1 slope data to read the transform coefficients stored in the transform coefficient storage portion 2.

In other words, the transform coefficients stored in the transform coefficient storage portion 2 are read in accordance with the read address supplied from the scanning order decision portion 5 in the order shown in FIG. 6A in which numerals denote the scanning order.

While the energy distribution of the transform coefficients in the 2D transform portion 1 is in a pattern shown in FIG. 4B, the energy slope classification portion 4 produces the m-bit slope data SCAN 2 in FIG. 5, and the scanning order decision portion 5 thus outputs the address corresponding to the m-bit slope data SCAN 2 so as to read the transform coefficients stored in the transform coefficient storage portion 2. Namely, the transform coefficients stored in the storage portion 2 are read in the order shown in FIG. 6B under the read address supplied from the scanning order decision portion 5. In FIG. 6B numerals denote the scanning order.

Assuming that the energy of the transform coefficients outputted from the 2D transform portion 1 is distributed in a pattern shown in FIG. 4C, the energy slope classification portion 4 outputs the m-bit slope data SCAN $2^m/2$ in FIG. 5 and the scanning order decision portion 5 produces the address corresponding to the m-bit slope data SCAN $2^m/2$ so as to read the transform coefficients in the transform coefficient storage portion 2. In this case, the transform coefficients in the transform coefficient storage portion 2 are read in the order (zigzag scanning) described in FIG. 1 by the read address supplied from the scanning order decision portion 5.

Furthermore, when the energy distribution of the transform coefficients is in a pattern in FIG. 4D, the energy slope classification portion 4 outputs an m-bit slope data SCAN $2^m-1$ in FIG. 5 and the scanning order decision portion 5 thus produces an address corresponding to the m-bit slope data SCAN $2^m-1$ to read the transform coefficients stored in the transform coefficient storage portion 2 in the order illustrated in FIG. 6C in which numerals denote the scanning order. Alternatively, if the distribution in energy of the transform coefficients is in a pattern shown in FIG. 4E, the energy slope classification portion 4 outputs an m-bit slope data SCAN $2^m$ and the scanning order decision portion 5 produces an address corresponding to the slope data so as to read the transform coefficients in the transform coefficient storage portion 2 in the order illustrated in FIG. 6D in which numerals denote the scanning order.

The transform coefficients thus read are entered into the data compression portion 6 where the coefficients are quantized and subjected to variable length coding to achieve a desired data compression. Of course, the data outputted from the data compression portion 6 includes the column (run-length, amplitude) defined by a size of an amplitude and the number of zero valued coefficients between the coefficients, and an EOB bit. Therefore, the EOB bit can be rapidly obtained as compared with using only the zigzag scanning order.

The multiplexer 7 functions to selectively output the compressed data from the data compression portion 6 and the m-bit slope data from the energy slope classification portion 4.

The data compressed by the encoder of FIG. 2 is entered to the decoder shown in FIG. 3. More specifically, the compressed data is first entered to a demultiplexer 11 in the decoder, which separates the compressed data and the slope data outputted from the multiplexer 7 of FIG. 2. The data restoring portion 12 restores the compressed data to original data (transform coefficients). The scanning order decision portion 13 receives the m-bit slope data separated by the demultiplexer 11 and selects a scanning order corresponding to the slope data from the $2^m$ scanning orders previously stored therein. The scanning order thus selected is supplied to the transform coefficient storage portion 14. Consequently, the transform coefficients outputted from the data restoring portion 12 are rearranged to the transform coefficients of an N×N block on the basis of the address supplied from the scanning order decision portion 13 and stored in the storage portion 14. The transform coefficients stored in the storage portion 14 are sequentially outputted in accordance with the address supplied from the read address counter 15. Subsequently, the transform coefficients are supplied to the 2D inverse transform portion 16 which transforms the signal back into the time domain, so as to obtain the original signal (digital input image or error component estimated through the DPCM loop).

As described above, when the transform coefficients are distributed slantwise in any one direction according to the image pattern, the scanning direction is selected in conformance with this distribution of the transform coefficients so as to quickly obtain the EOB bit. As a result, the image data can be compressed effectively, thereby improving the compressed data transferring efficiency.

The present invention has been described with respect to energy distribution classified with respect to a linear function, but it may be considered that the energy distribution is classified in a non-linear pattern.

Although the present invention has been described with respect to a specific embodiment, it will be understood that various changes and modifications may be made therein without departing from the scope and spirit of the invention.

What is claimed is:

1. An apparatus for scanning image data using an energy distribution pattern of two-dimensional data, comprising:

an encoder for transforming input image signals of a time domain into signals of a frequency domain;

a scanner for scanning the transform coefficients of an N×N block, where N is an integer, in accordance with the energy distribution pattern;

a compressor for compressing and transferring the scanned transform coefficients; and a decoder for restoring the compressed data transferred from the compressor and for rearranging the transform coefficients into original image data of N×N blocks in conformance with the scanning order based on the energy distribution pattern;

wherein said encoder comprises:

a two-dimensional transform portion for convening the input image signal into transform coefficients of an N×N block of said frequency domain;

a transform coefficient storage portion for storing the transform coefficients at the output of the two-dimensional transform portion in accordance with the output signal of a write address counter;

an energy slope classification portion for identifying a distribution pattern in energy of the N×N block of transform coefficients and producing data corresponding to the slope data thereof;

a scanning order decision portion for selecting the scanning order corresponding to the slope data outputted from the energy slope classification portion and outputting the selected scanning order to the transform coefficient storage portion;

a data compression portion for quantizing the transform coefficients sequentially outputted from the transform coefficient storage portion and compressing the data using a variable length coding process; and a multiplexer for selectively outputting the compressed data output from the data compression portion and the slope data output from the energy slope classification portion.

2. An image data scanning apparatus according to claim 1, wherein said transform coefficient storage portion is composed of a video RAM.

3. An image data scanning apparatus according to claim 1, wherein said scanning order decision portion has addresses corresponding to $2^m$ different scanning orders with respect to m-bit slope data outputted from the energy slope classification portion, where m is an integer.

4. An image data scanning apparatus according to claim 1, wherein said scanning order decision portion is composed of a ROM.

5. An image data scanning apparatus according to claim 1, wherein said decoder comprises:

a demultiplexer for separating the compressed data output from the compressor and the slope data output from the energy slope classification portion;

a data restoring portion for restoring the compressed data to the form it was in before the compression process;

a scanning order decision portion for receiving the slope data separated by the demultiplexer and selecting a scanning order corresponding to the slope data from a plurality of scanning orders stored therein;

a transform coefficient storage portion for rearranging the transform coefficients outputted from the data restoring portion to the transform coefficients of an N×N block in accordance with an address supplied from the scanning order decision portion, storing the rearranged transform coefficients and sequentially outputting the transform coefficients by using an address supplied from a read address counter; and, a two-dimensional inverse transform portion for transforming the transform coefficients to time domain signals.

6. An image data scanning apparatus according to claim 5, wherein said scanning order decision portion stores addresses corresponding to $2^m$ different scanning orders with respect to the m-bit slope data output from the energy slope classification portion of the encoder.

7. An image data scanning apparatus according to claim 5, wherein said scanning order decision portion is composed of a ROM.

8. An image data scanning apparatus comprising transform means for transforming an input time domain image signal into frequency domain coefficients;

storage means for storing said coefficients; and read address generating means for generating read addresses for reading out said coefficients from said storage means in a particular order depending on a slope of an energy distribution of said coefficients output from said transform means.

9. An apparatus as claimed in claim 8, wherein said read address generating means further comprises:

energy slope classification means for receiving said coefficients from said transform means and for determining said slope; and scanning order decision means for receiving said slope from said classification means and for outputting a pattern of read addresses based on said slope.

* * * * *